United States Patent [19]

Matthews et al.

[11] Patent Number: 5,033,854
[45] Date of Patent: Jul. 23, 1991

[54] MULTIPLEXED FIBEROPTIC GYRO CONTROL

[75] Inventors: Anthony Matthews; Guy T. Varty, both of Woodland Hills; J. Scott Darling, Chatsworth, all of Calif.

[73] Assignee: Litton Systems, Inc., Woodland Hills, Calif.

[21] Appl. No.: 447,560

[22] Filed: Dec. 6, 1989

[51] Int. Cl.⁵ .............................................. G01B 9/02
[52] U.S. Cl. .................................................. 356/350
[58] Field of Search ........................... 356/350; 372/94

[56] References Cited

U.S. PATENT DOCUMENTS 4,828,389  5/1989  Gubbins et al. ...................... 356/350

FOREIGN PATENT DOCUMENTS 2941618  4/1981  Fed. Rep. of Germany ...... 356/350
3235401  3/1984  Fed. Rep. of Germany ...... 356/350

Primary Examiner—Samuel Turner

[57] ABSTRACT

Apparatus and methods are disclosed for the time division multiplexing of fiberoptic gyros to reduce the amount of control electronics required. Each of a plurality of gyros is sampled at a rate of $n\tau$, where $\tau$ is the gyro optical transit time and n is an integer. The sampled signal is fed to a digital signal processor (DSP) for processing and used to form a rate feedback signal. The rate feedback signal is converted to analog form to drive the phase modulator drive of each gyro. In preferred embodiments the multiplexed sample rate is at least ten times the bandwidth of the gyros. The rate data can be filtered and output by the DSP and the DSP can integrate the rate data to give angle data. The use of precision analog circuits is avoided.

13 Claims, 2 Drawing Sheets

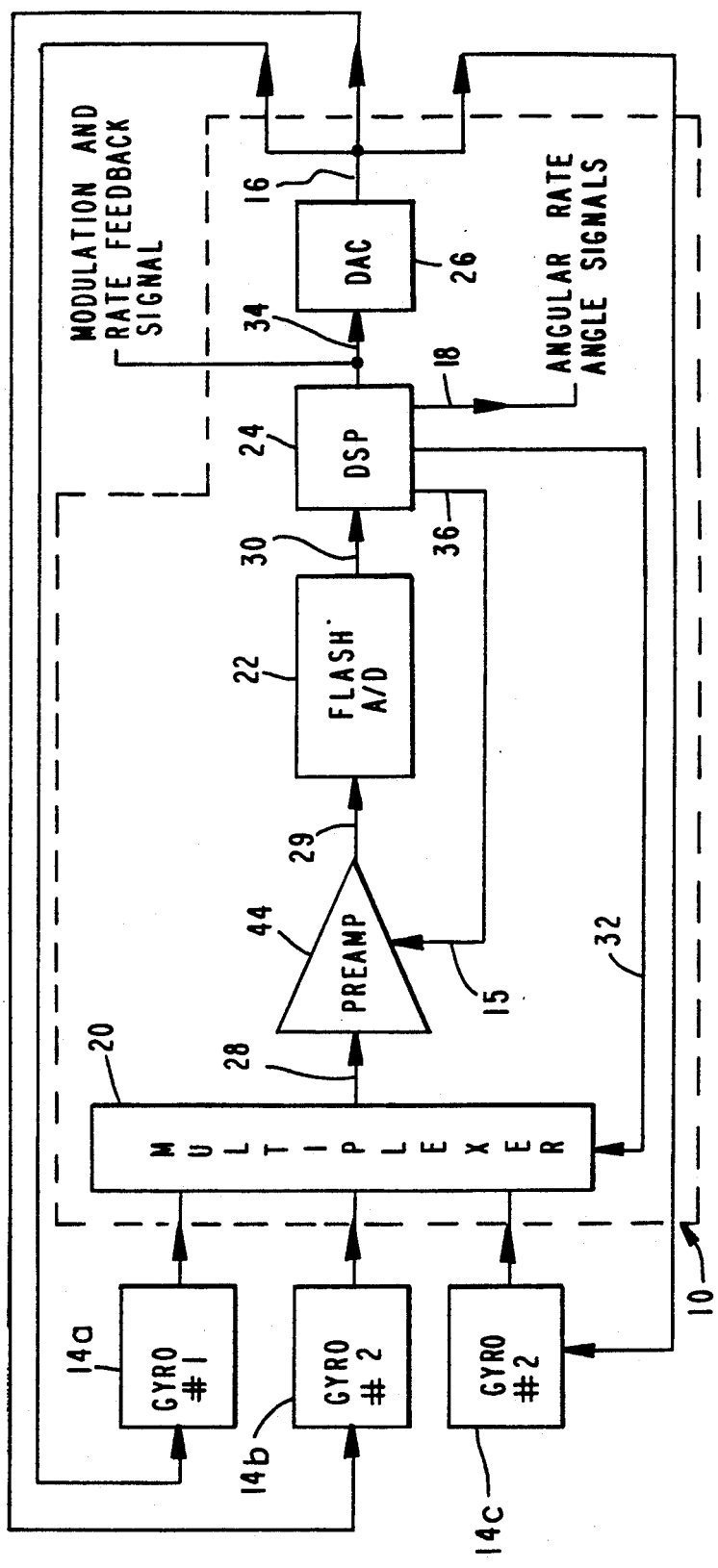

MULTIPLEXED FIBEROPTIC GYRO CONTROL

GOVERNMENT RIGHTS IN INVENTION

This invention was made with support under contract F04701-87-C-0065 awarded by the United States Air Force Space Division. The Government has certain rights in this invention.

BACKGROUND OF THE INVENTION

1. Field of the Invention

The invention relates generally to control techniques for fiberoptic gyros, and especially to apparatus and methods for time division multiplexing in controlling a plurality of fiberoptic gyros.

2. Description of the Related Art

A fiberoptic interferometer used for rotation sensing and measurement generally comprises a coherent source of light, a closed optical path, means for coupling light from the source into and out of the closed path, and means for detecting and processing the optical interference signal coming from the closed path.

There are two types of disturbances in an optical path that can give rise to phase shifts in light waves traveling in opposite directions around a closed optical path: reciprocal and nonreciprocal. A reciprocal disturbance is one that affects either light wave in a similar manner despite the fact that the two waves are traveling in different directions and may be subjected to the disturbance at different times. A nonreciprocal disturbance affects the two waves differently, either because it occurs over a time interval comparable to the time it takes a wave to travel around the closed path, or because the effect it has on a wave depends on the direction of propagation of the wave around the closed path.

The Sagnac effect, a relativistic physical phenomenon, is a nonreciprocal effect in which the rotation of a closed optical path causes light waves propagating in opposite directions along the path to take different amounts of time to complete a transit of the closed path. The difference in transit time results in a phase difference between the two light waves proportional to rotation rate. When the beams are recombined on a photodetector, they give rise to an interference pattern which is a function of the nonreciprocal phase shift. Measurement of the phase difference is a measure of the rate of rotation of the optical path.

If $\phi_s$ denotes the Sagnac phase difference between the recombined counterpropagating light beams, the intensity of light due to the interfering beams varies as $\cos(\phi_s)$. When the phase difference is close to zero, the cosine function varies only slightly with changes in phase difference. In addition, it is impossible to determine the sign of the phase shift from this operating point. In order to increase the sensitivity of detection, it is advantageous to introduce artificially an added fixed phase shift or "bias" to shift to a point of operation on the cosine curve where the rate of change of intensity with respect to $\phi_s$ is greater. In particular, maximum sensitivity and linearity of response are achieved by introducing a nonreciprocal phase bias such as $\pi/2$ radians. At this point, the light intensity is proportional to $\cos(\phi_s + \pi/2) = \sin(\phi_s)$. The periodic nature of the cosine function results in an equivalent maximum sensitivity and linearity of response (apart from algebraic sign) at any odd integral multiple of plus or minus $\pi/2$.

Nonreciprocal phase shifts may be induced in a fiberoptic gyro by a reciprocal phase modulator placed near one end of the fiber coil. In order to obviate stability problems, various methods have been proposed for modulating the phase of the light waves propagating within the closed optical path of a Sagnac interferometer.

A phase modulator device can be based, for example, on the change in refractive index with applied voltage in an electro-optic crystal forming part of the closed optical path of the interferometer. If the electro-optic phase modulator is placed near one end of the fiber coil, application of a voltage to the modulator produces a modulation of the phase of one of the counterpropagating waves entering the loop that is not experienced by the other until it has traveled all the way around the coil. The second wave experiences a phase modulation which is delayed by the length of time required for light to propagate around the coil, a time given by $$Y_o = nL/c,$$

where n is the index of refraction of the fiber material, L is the length of the fiber coil, and c is the speed of light in vacuum. If V(t) is a time-varying signal applied to the phase modulator, the phase difference between the counterpropagating light waves is proportional to $V(t) - V(t - Y_o)$. In this way a phase bias can be produced which sets the operating point of the interferometer.

If there is a rotation of the fiber coil, a phase shift $\phi_s$ will be added to the phase bias due to the nonreciprocal nature of the Sagnac effect. Although it is possible to use the output signal of the photodetector to estimate the rotation directly, it is preferable to use a "nulling" or "zeroing" method and to estimate the rotation from a feedback modulation signal, in order to avoid errors resulting from drifts in the signal detection electronics. The idea is to generate a feedback modulation signal which introduces a nonreciprocal phase shift in the optical circuit which is equal in magnitude but opposite in sign to the rotationally-induced phase shift, thereby "nulling" or "zeroing" the variation of the intensity signal. Application of the feedback modulation signal to the phase modulator produces a phase difference between the counterpropagating waves which is continuously equal and opposite in sign compared to the phase shift induced by the rotation of the closed optical path. A method such as this in which there is a closed feedback loop is often referred to as a "closed-loop" method.

One method of closed-loop feedback, generally known as the "serrodyne method," makes use of a feedback modulation signal which is a reciprocal phase ramp having a slope proportional to $\phi_{so}/Y_o$, where $\phi_{so}$ is a constant rotationally-induced phase shift and $Y_o$ is the time taken for a light wave to travel around the closed light path of the interferometer in the absence of any rotation. A bias modulation signal consists of a voltage square-wave having an amplitude which induces a phase shift of plus or minus $\pi/2$ radians and a frequency equal to $\frac{1}{2}Y_o$. Since the reciprocal phase ramp signal cannot increase indefinitely, the serrodyne method actually generates a sawtooth feedback waveform with a peak-to-peak amplitude of $2\pi$ radians, with the $2\pi$ phase transition effectively resetting the operating point of the interferometer to an equivalent position on the intensity interference curve relating output signal to input phase difference.

In a typical serrodyne method a digital phase ramp in the form of a staircase-shaped voltage feedback signal is combined with a bias modulation signal of the type described above. The digital staircase signal consists of a sequence of voltage steps, each of duration $Y_o$, to the phase modulator. In general, the amplitude of each step change is calculated to provide a nonreciprocal phase shift of plus or minus $\pi/2$ radians minus a Sagnac phase estimate. The intensity output of the interferometer is demodulated at the bias modulation frequency, namely $\frac{1}{2}Y_o$.

The resulting signal is proportional to the residual Sagnac phase shift. It is this signal that a closed-loop controller will act to "null" or "zero." To avoid problems with voltage saturation, the modulation steps are occasionally required to "roll over" in the phase bias resetting operation described above. The step voltage to the phase modulator is adjusted to provide an additional phase shift of plus or minus $2\pi$ radians to keep the voltage to the phase modulator in a reasonable operating range. Additional demodulation logic may be employed during these roll-overs to determine the error in estimated phase modulator gain. Through subsequent roll-overs, the estimated phase modulator gain error may be nulled. The phase modulator gain is the proportionality constant relating the phase induced by the phase modulator in response to a given value of input voltage. This secondary loop control, as it is formally known, provides additional scale factor stability to the sensor. The scale factor for a closed-loop rotation sensing interferometer is proportional to the product of the Sagnac scale factor and the phase modulator gain. The Sagnac scale factor is the constant of proportionality between rate of rotation and the Sagnac phase shift.

The cost of electronics is significant in the production of fiberoptic gyro systems. It would be advantageous to be able to use a single set of electronics to control a plurality of fiberoptic gyros.

SUMMARY OF THE INVENTION

In accordance with the invention, apparatus and methods are disclosed for the time division multiplexing of fiberoptic gyros to reduce the amount of control electronics required. Each of a plurality of gyros is sampled at a rate of nY, where Y is the gyro optical transit time and n is an integer. The sampled signal is passed into a digital signal processor (DSP) where it is processed and used to form a rate feedback signal. The rate feedback signal is applied via a digital-to-analog converter and drive to the phase modulator drive of each gyro. In preferred embodiments the multiplexed sample rate is at least ten times the bandwidth. In a first preferred embodiment a plurality of gated preamplifiers amplify selected portions of the gyro photodetector output signals which go to a plurality of multiplexer inputs. In an alternative preferred embodiment a single gated preamplifier is connected to the multiplexer output, and the plurality of multiplexer inputs are connected to the gyro photodetector outputs. Advantages of the invention are that the rate data can be filtered and output by the digital signal processor and that the DSP can integrate the rate data to give angle data. The use of precision analog circuits is thus avoided. The invention takes advantage of the fact that a gyro need not be continuously operating in order to act as an inertial angular sensor.

BRIEF DESCRIPTION OF THE DRAWINGS

The Various features and advantages of the present invention are apparent in light of the following detailed description taken together with the accompanying drawings, in which:

FIG. 2 is a schematic diagram of the multiplexer portion of the time-multiplexed gyro control electronics of FIG. 1; and, FIG. 3 is a schematic block diagram of an alternative embodiment of time-multiplexed gyro control electronics in accordance with the invention.

DESCRIPTION OF THE PREFERRED EMBODIMENT

Figure 1:
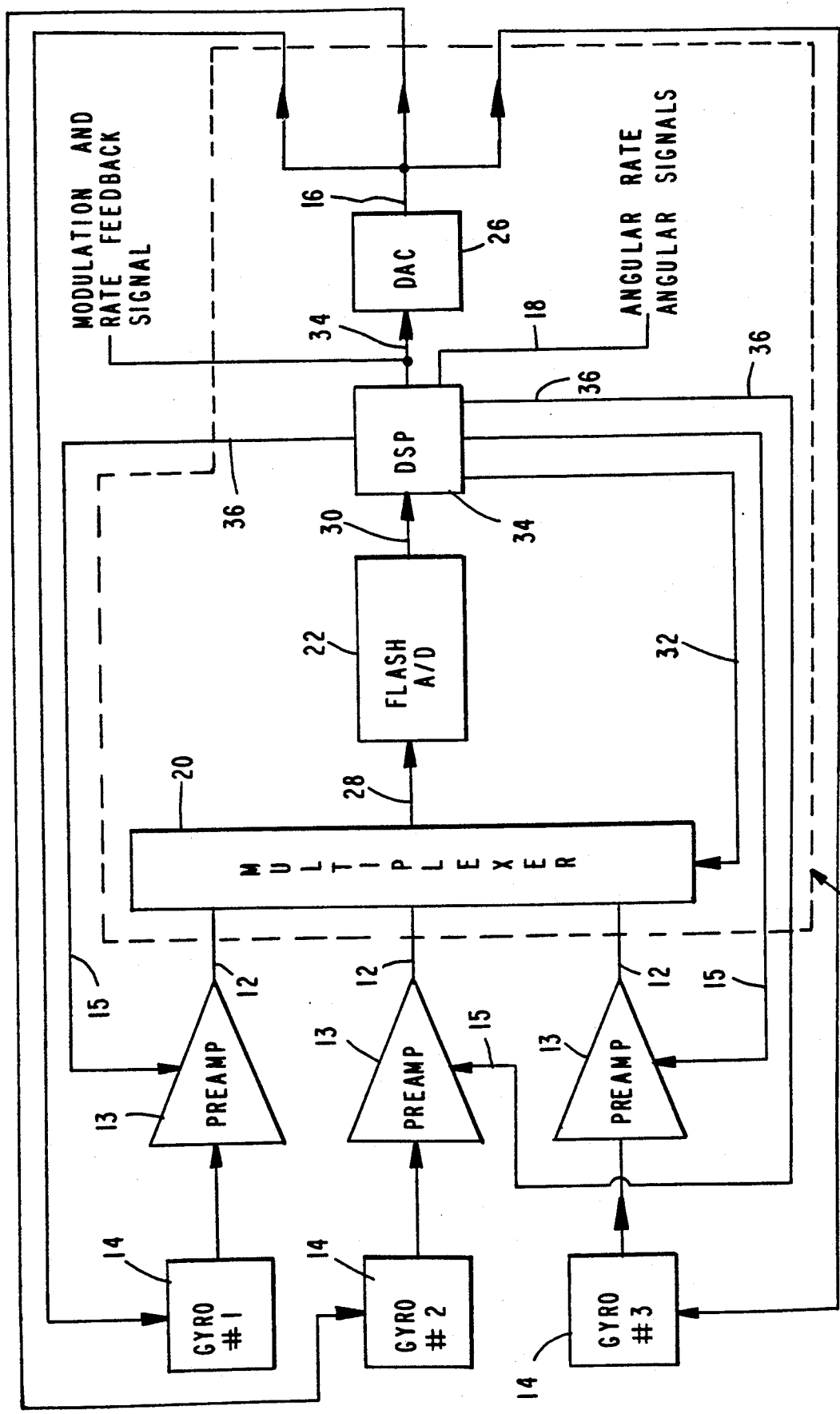
FIG. 1 is a schematic block diagram of time-multiplexed gyro control electronics in accordance with the invention.

Methods and apparatus are presented in accordance with the invention for controlling a plurality of fiberoptic gyros with a single set of multiplexing control electronics 10, a schematic block diagram of which is shown in FIG. 1. Multiplexing control electronics 10 has a plurality of gated preamplified inputs 12 (shown as three in FIG. 1 but not limited to that number) from a corresponding plurality of gated preamplifiers 13. Preamplifiers 13 follow fiberoptic gyros 14 to amplify the photodetector output signals from the gyros 14; they haVe gating inputs 15 for gating signals. Multiplexing control electronics 10 has an output 16 to fiberoptic gyros 14, and an output 18 at which angular rate and angle signals appear. Multiplexing control electronics 10 comprises a multiplexer 20 to which gated preamplified inputs 12 lead, a flash analog-to-digital converter 22, a digital signal processor 24, and a digital-to-analog converter 26 with an output 16.

A single output 28 from multiplexer 20 goes to flash analog-to-digital converter 22, from which an output 30 goes to digital signal processor 24. Digital signal processor 24 provides a channel selector signal at an output 32, an angular rate signal at output 18, an angle signal at output 18, a modulation and rate feedback signal at an output 34, and a preamplifier gating signal at an output 36. Output 34 is connected to the input of digital-to-analog converter 26, which has an output 16 connected to the plurality of fiberoptic gyros 14. The signal appearing at output 16 is a phase modulator drive signal which is fed to each of the individual phase modulators of fiberoptic gyros 14 simultaneously.

Multiplexer 20 is essentially an electronic switch which switches one of the plurality of inputs 12 to a single output 28. As shown in FIG. 2, which is a schematic diagram of multiplexer 20, inputs 12a, 12b, and 12c each lead to normally open switches 40a, 40b, and 40c, respectively, which are controlled by lines 42a, 42b, and 42c, respectively, from digital signal processor 24. When a channel-select signal from DSP 24 is present on one of the control lines 42, the corresponding electronic switch 40 closes. The signal present on the input 12 of that electronic switch then appears on output 28 of multiplexer 20.

In an alternative embodiment, depicted in the schematic block diagram of FIG. 3, multiplexer 20 is disposed between gyros 14a, 14b, and 14c and a single gated preamplifier 44. The output 29 of gated preamplifier 44 is fed to flash analog-to-digital converter 22. Preamplifier 44 has a gating input 15 to which a gating signal is sent from output 36 of DSP 24. The rest of the circuitry shown in block form operates in the same way as was explained above with reference to FIG. 1.

The above-described embodiments are furnished as illustrative of the principles of the invention, and are not intended to define the only embodiment possible in accordance with our teaching. Rather, the invention is to be considered as encompassing not only the specific embodiments shown, but also any others falling within the scope of the following claims.

What is claimed is:

1. A method of controlling a plurality of fiberoptic gyros comprising:
    connecting an undemodulated, non-integrated, preamplified electrical output of each of said gyros to a multiplexing means, said multiplexing means having an output at which an electrical signal from only one of said gyros appears;
    connecting said output of said multiplexing means to an input of a gyros controller;
    alternately switching, with said multiplexing means, from one gyro output to another in a predetermined sequence;
    operating on said electrical signal, after converting said electrical signal to a digital signal, from said one of said gyros with a digital processor to produce a modulation and rate feedback signal, and, optionally, an angular rate signal, an angle signal or both; and
    applying said modulation and rate feedback signal to an input of each of said gyros to drive a phase modulator included in each of said gyros.

2. A method of controlling a plurality of fiberoptic gyros with a single set of multiplexing control electronics, each said gyro providing an undemodulated, non-integrated electrical signal at an output which is fed to an associated preamplifier, comprising:
    connecting a preamplified signal output of each of said preamplifiers to a multiplexing means, said multiplexing means having an output at which a preamplified signal from only one of said gyros appears;
    selecting one of said gyros so that said preamplified signal corresponds to its output;
    gating said preamplifier associated with said one gyro with a gating signal to select portions of said preamplified signals to be passed;
    connecting said output of said multiplexing means to an input of an analog-to-digital converter;
    sampling said preamplified signal with said analog-to-digital converter to produce a corresponding digital signal;
    operating one said digital signal with a digital signal processor to produce a digital modulation and rate feedback signal, said gating signal, and, optionally, an angular rate signal, an angle signal, or both;
    converting said digital modulation and rate feedback signal to a corresponding analog signal;
    applying said corresponding analog signal to an input of a phase modulator included in said one of said gyros;
    repeating the sequence of above steps for each of the remaining gyros in said plurality of gyros; and
    repeating the sequence of above steps as long as operation of the gyros is desired.

3. An apparatus for controlling a plurality of fiberoptic gyros, comprising:
    multiplexing means having a plurality of amplified electrical inputs from said fiberoptic gyros and having an undemodulated, non-integrated, preamplified output at which an electrical signal from only one of said gyros appears;
    gyro controller means having an input connected to said output of said multiplexing means, for operating on said electrical signal of said one of said gyros with a digital signal processing means to produce a modulation and rate feedback signal, and, optionally, an angular rate signal, an angle signal, or both; and
    means for applying said modulation and rate feedback signal to an input of each of said gyros to drive a phase modulator included in each of said gyros.

4. The apparatus of claim 3 wherein said gyro controller means comprises:
    sampling means having an input connected to said output of said multiplexing means, for converting said electrical signal to a corresponding digital signal at an output;
    said digital signal processing means being connected to said output of said sampling means for operating on said digital signal to produce a digital modulation and rate feedback signal at a first output, an angular rate signal at a second output, an angle signal at a third output, and a gating signal at a fourth output for gating said inputs to said multiplexing means;
    digital-to-analog conversion means connected to said first output of said digital signal processing means, for converting said digital modulation and rate feedback signal to a corresponding analog signal at an output; and
    phase modulation drive selection means having an input responsive to said corresponding analog signal for applying said corresponding analog signal to an input of said phase modulator included in said gyro.

5. The apparatus of claim 3 wherein said multiplexing means includes channel selection means for periodically selecting one of said gyros to which said electrical signal at said output of said multiplexing means corresponds, operatively connected to said multiplexing means; and wherein said digital signal processing means provides a channel-selection signal at a fourth output connected to said multiplexing means.

6. The apparatus of claim 3 further comprising a plurality of gated preamplification means, each preamplification means having a first input from a photodetection means in a corresponding one of said gyros, a second input from said signal processing means, and having an output connected to a corresponding input of said multiplexing means.

7. The apparatus of claim 3 further comprising a single gated preamplification means for amplifying selected portions of an input signal, having a first input from said output of said multiplexing means, a second input from said signal processing means, and having an output connected to said input of said flash analog-to-digital conversion means.

8. An apparatus for controlling a plurality of fiberoptic gyros, comprising:
    multiplexing means having a plurality of gated preamplified undemodulated, non-integrated inputs from said fiberoptic gyros and having an output at which an electrical signal from only one of said gyros appears;
    sampling means having an input connected to said output of said multiplexing means, for converting said electrical signal to a corresponding digital signal at an output;

digital signal processing means connected to said output of said sampling means for operating on said digital signal to produce a digital modulation and rate feedback signal at a first output, an angular rate signal as desired at a second output, an angle signal as desired at a third output, and a gating signal at a fourth output for gating said preamplified inputs to said multiplexing means;

digital-to-analog conversion means connected to said first output of said digital signal processing means, for converting said digital modulation and rate feedback signal to a corresponding analog signal at an output; and phase modulation drive selection means having an input responsive to said corresponding analog signal for applying said corresponding analog signal to an input of said phase modulator included in said gyro.

9. The apparatus of claim 8 further comprising a plurality of gated preampification means, each preamplification means having a first input from a photodetection means in a corresponding one of said gyros, a second input from said signal processing means, and having an output connected to a corresponding input of said multiplexing means.

10. The apparatus of claim 8 wherein said multiplexing means includes channel selection means for periodically selecting one of said gyros to which said electrical signal at said output of said multiplexing means corresponds, operatively connected to said multiplexing means; and wherein said digital signal processing means provides a channel-selection signal at a fourth output connected to said multiplexing means.

11. The apparatus of claim 8 wherein said sampling means comprises a flash analog-to-digital converter.

12. The apparatus of claim 8 wherein said multiplexing means comprises:

a plurality of electronic switching means, each said switching means having one side connected to one of said gated preamplified inputs and another side connected to said output, for connecting said an input of said switching means with said output; and a plurality of channel-selection control means, each said means controlling one of said electronic switching means, operatively connected to said one of said switching means.

13. The apparatus of claim 12 wherein each of said electronic switching means comprises a normally open single-pole, double-throw switch.

* * * * *